Patented Nov. 20, 1951

2,575,558

UNITED STATES PATENT OFFICE 2,575,558

GLYCIDYL ETHER COMPOSITIONS AND METHOD OF USING SAME

Herbert A. Newey, Richmond, and Edward C. Shokal, Oakland, Calif., assignors to Shell Development Company, San Francisco, Calif., a corporation of Delaware No Drawing. Application July 26, 1948, Serial No. 40,785

10 Claims. (Cl. 154—140)

This invention relates to a composition of matter having properties which make it particularly suitable for use as a cold-setting adhesive.

It has long been recognized that many useful articles could be manufactured if there were a satisfactory means for uniting metal surfaces in a strong but inexpensive manner, i. e., other than by bolting, riveting, welding or soldering. Conventional adhesive compositions, e. g., glue, which operate by evaporation of the solvent therefrom, are unsuitable for such use because the metal is impervious and the solvent is unable to evaporate, particularly when the surfaces united are of considerable size. Moreover, the adhesive or active ingredient in most of such compositions does not set up or cure to an insoluble state. Consequently, subsequent contact of the united article with the solvent results in failure of the adhesive bond. Some adhesive compositions known heretofore have employed ingredients which convert to insoluble materials upon application of heat. A typical ingredient is resorcinol-modified phenol-formaldehyde resin. However, the necessity for application of heat in order to achieve a cure is a serious disadvantage entailing expense. Moreover, the shear strength obtained is not very high even with these hot-setting adhesives, especially when metal surfaces are joined.

In order to be satisfactory for use in manufacture of articles from metal or other materials having impervious surfaces, the adhesive composition must meet a number of requirements. It must operate without evaporation of solvent therefrom. It must set up and cure without application of heat. Even if the latter requirement is achieved by adding a chemical curing agent to the adhesive ingredient so as to effect cure thereof, certain additional requirements are necessary. After addition of the curing agent, it is essential that the composition retain a workable fluid consistency to permit application and spreading for a reasonable time. In other words, the "pot life" of the composition must be from about 4 to 10 hours so as to enable workmen to apply the composition to the surfaces desired to be united. While this reasonable pot life is required, it is also necessary that the composition set up and cure sufficiently within another 16 to 20 hours so that surfaces joined therewith will have adequate strength within reasonable time to permit handling of the manufactured articles. It is further desirable that the curing continue so as to give maximum strength within a week's time. To be useful it is of course essential that the shear strength of the cured composition itself and the bonding strength to the surface which is joined be high, and that the adhesive bond be resistant to the action of solvents, especially water.

We have now discovered that the above objects are accomplished by employing triethylamine as curing agent with glycidyl ethers of polyhydric phenols. This amine is unique for the purposes intended. After addition of it to a fluid mixture of the glycidyl ether, the viscosity of the composition (which is a measure of its fluidity) only increases slowly during the 4 to 10 hours' period and then the viscosity begins to increase very rapidly with gelation and setting up to reasonable hardness and strength occurring within an additional 16 hours' time. These unique properties enable the adhesive composition to be compounded and thereafter a reasonable time remains for application of the composition to the surfaces desired to be joined. Moreover, the composition after application sets up and hardens within a short time so as to give an adhesive bond of sufficient strength to enable handling of the manufactured article wherein it is used. Such closely related amines as trimethylamine, diethylamine, triethanolamine, di-n-propylamine, di-isopropylamine and methyl diisopropylamine fail in one or more aspects in comparison with triethylamine as curing agent.

The material contained in the composition of the invention which is subject to cure is a glycidyl ether of a dihydric phenol having a 1,2-epoxy equivalency of greater than one. By the epoxy equivalency reference is made to the average number of 1,2-epoxy groups

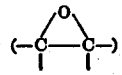

contained in the average molecule of the glycidyl ether. The glycidyl ethers of dihydric phenols owing to their method of preparation are ordinarily a mixture of chemical compounds which, although they are of similar identity and chemical constitution, have different molecular weights. The measured molecular weight of the mixture upon which the epoxy equivalency is dependent shall necessarily be an average molecular weight. Consequently, the epoxy equivalency of the glycidyl ether mixture will not necessarily be the integer two, but will be a value which is greater than one. For example, a glycidyl ether suitable for use in the invention is made by reacting bis-(4-hydroxyphenyl)-2,2-propane with epichlorhydrin in alkaline solution in a mol ratio of about 1.4 mols of epichlorhydrin per mol of the dihydric phenol. The product is a solid mixture of glycidyl ethers having a measured average molecular weight of 791. Analysis shows the product to contain about 0.169 equivalent of epoxy per 100 grams. Consequently, the product has an epoxy equivalency of about 1.34, i. e., an average of about 1.34 epoxy groups per molecule.

The 1,2-epoxide value of the glycidyl ether is determined by heating a one gram sample of the ether with an excess of pyridinium chloride dissolved in pyridine (made by adding pyridine to 16 cc. of concentrated hydrochloric acid to a total volume of one liter) at the boiling point for 20 minutes whereby the pyridinium chloride hydrochlorinates the epoxy groups to chlorhydrin groups. The excess pyridinium chloride is then back titrated with 0.1 N sodium hydroxide to the phenolphthalein end point. The epoxide value is calculated by considering one HCl as equivalent to one epoxide group. This method is used for obtaining all the epoxide values discussed herein.

The glycidyl ethers of the dihydric phenols used in the composition of the invention are prepared by reacting a dihydric phenol with epichlorhydrin in alkaline solution. For this purpose any of the various dihydric phenols are used, including mononuclear phenols like resorcinol, catechol, hydroquinone, etc., or polynuclear phenols like bis-(4-hdroxyphenyl)-2,2-propane (bis-phenol), 4,4'-dihydroxybenzophenone, bis-(4 - hydroxyphenyl)-1,1-ethane, bis-(4-hydroxyphenyl) - 1,1-isobutane, bis-(4-hydroxyphenyl)-2,2 - butane, bis - (4 - hydroxy-2-methylphenyl)-2,2 - propane, bis - (4 - hydroxy - 2-tertiarybutylphenyl)-2,2-propane, bis-(2 - hydroxynaphthyl)-methane, 1,5-dihydroxynaphthalene, etc.

The glycidyl ethers of the dihydric phenols are made by heating at 50° C. to 150° C. the dihydric phenol with epichlorhydrin, using one to two or more mols of epichlorhydrin per mol of the dihydric phenol. Also present is a base such as sodium, potassium, calcium or barium hydroxide in amount of 10% to 30% stoichiometric excess of the epichlorhydrin—i. e., 1.1 to 1.3 equivalents of base per mol of epichlorhydrin. The heating is continued for several hours to convert the reactant to a taffy-like consistency whereupon the reaction product is washed with water until free of base. Although the product is a complex mixture of glycidyl ethers, the principal product may be represented by the formula

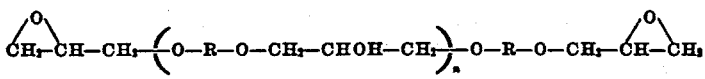

wherein R represents the divalent hydrocarbon radical of the dihydric phenol and $n$ is 0, 1, 2, 3, etc. The length of the chain can be made to vary by changing the molecular proportion of epichlorhydrin and dihydric phenol. Thus by decreasing the mols of epichlorhydrin per mol of dihydric alcohol from about two downwards toward one, the molecular weight and the softening point of the resinous glycidyl ether is increased. In general, these glycidyl ethers, having an epoxy equivalency between one and two, contain terminal 1,2-epoxy groups, and have alternate aliphatic and aromatic nuclei linked together by ethereal oxygen atoms.

The nature of the glycidyl ethers from dihydric phenols can be better understood by considering preparation of a particular product which we prefer to use in our invention. This product will hereinafter be designated by the term Ether A.

ETHER A

In a reaction vessel fitted with a stirrer, 4 mols of bis-(4-hydroxyphenyl)-2,2-propane (bis-phenol) and 5 mols of epichlorhydrin are added to 6.43 mols of sodium hydroxide as a 10% aqueous solution. While being stirred, the reaction mixture is gradually heated to about 100° C. during 80 minutes time and is maintained at 100–104° C. for an additional 60 minutes under reflux. The aqueous layer is decanted and the resin washed with boiling water until neutral to litmus whereupon the resin is drained and dehydrated by heating to about 150° C.

The resulting resinous glycidyl ether has a softening point of 100° C. (Durran's Mercury Method) and a molecular weight of 1133 measured by boiling point elevation of a dioxane solution. The epoxide value is 0.116 equivalent per 100 grams so the epoxide equivalency is 1.32 epoxide groups per molecule.

In like manner, other resinous glycidyl ethers of bis-phenol may be prepared which will have different molecular weights depending upon the molar ratio of epichlorhydrin to dihydric phenol used in preparation thereof. This fact is illustrated by the following table which shows the variation in properties with variation in the molar ratio.

| Mol Ratio Epichlorhydrin to bis-Phenol | Mol Ratio NaOH to Epichlorhydrin | Softening Point | Molecular Weight | Equiv. Epoxy per 100 gms. | Epoxy Groups per Mol |
|---|---|---|---|---|---|
| | | ° C. | | | |
| 2.0 | 1.1 | 43 | 451 | 0.318 | 1.39 |
| 1.4 | 1.3 | 84 | 791 | 0.169 | 1.34 |
| 1.33 | 1.3 | 90 | 802 | 0.137 | 1.10 |
| [1] 1.25 | 1.3 | 100 | 1,133 | 0.116 | 1.32 |
| 1.2 | 1.3 | 112 | 1,420 | 0.085 | 1.21 |

[1] Resin A.

These glycidyl ethers from bis-phenol are a complex mixture of compounds believed to have as the principal component thereof a substance which may be represented by the formula

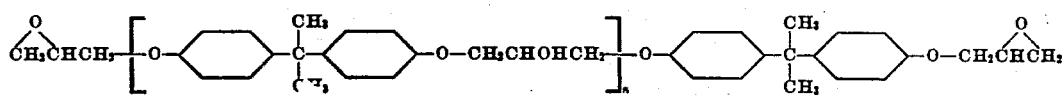

wherein $n$ is 0, 1, 2, 3, etc. It may be noted that the observed molecular weight and epoxy value is probably low due to inherent inaccuracies of the methods of determining the values. The epoxy value appears to give only about 60% of the theoretical value, but in any event the epoxy equivalency is greater than one and the glycidyl ethers cure to hard, tough, insoluble resins with the curing agent used in the invention.

In general, the glycidyl ethers of the dihydric phenols are solid or substantially solid at room temperature. In order for the adhesive composition to have a workable fluid consistency, it is necessary that some other ingredient be added so that the viscosity at 20° C. will be from 500 to 100,000 centipoises, preferably from 1000 to 50,000 centipoises. To obtain such fluidity there may be added non-volatile solvents such as dibutyl phthalate or tricresyl phosphate. However, the incorporation of such substances into the composition tends to decrease the shear strength of the cured material. Consequently, it is preferred to employ as viscosity reducer, a liquid reactive solvent, i. e., a liquid compound containing a 1,2-epoxy group or groups such as styrene oxide, butadiene monoxide, phenyl glycidyl ether or glycidyl ethers of polyhydric alcohols such as ethylene glycol, diethylene glycol, propylene glycol, or glycerol. The polyglycidyl ether from the latter alcohol is particularly preferred as a diluent. Polyglycidyl ethers of other polyhydric alcohols are also suitable. These are prepared by reacting the polyhydric alcohol with epichlorhydrin in the presence of 0.1% to about 2% of an acid acting compound as catalyst such as boron trifluoride, hydrofluoric acid or stannic chloride, whereby the glycidyl ether is formed as product. The reaction is effected at about 50° C. to 125° C. with the proportions of reactants being such that there is about one mol of epichlorhydrin for each molecular equivalent of hydroxyl group in the polyhydric alcohol. Thus in preparing the ether of diethylene glycol, which glycol contains two hydroxyl groups in each molecule thereof, about two mols of epichlorhydrin for each mol of diethylene glycol are used. The resulting chlorhydrin ether from the reaction of a polyhydric alcohol with epichlorhydrin is dehydrochlorinated by heating at about 50° C. to 125° C. with a small, say 10%, stoichiometrical excess of a base. For this purpose, sodium aluminate gives good results.

Preparation of the polyglycidyl ethers of the polyhydric alcohols may be illustrated by considering application of the foregoing method in preparing the glycidyl ether of glycerol, the preferred reactive solvent which will be referred to hereinafter as Ether B.

ETHER B

In parts by weight, about 276 parts of glycerol (3 mols) are mixed with 828 parts of epichlorhydrin (9 mols). To this reaction mixture is added 10 parts of a diethyl ether solution containing about 4.5% of boron trifluoride. The temperature rises as a result of the exothermic reaction and external cooling with ice water is applied so as to keep the temperature between about 50° C. and 75° C. during a reaction period of about 3 hours. About 370 parts of the resulting glycerol-epichlorhydrin condensate are dissolved in 900 parts of dioxane containing about 300 parts of sodium aluminate. While agitating, the reaction mixture is heated and refluxed at 93° C. for about 9 hours. After cooling to atmospheric temperature, the insoluble material is filtered from the reaction mixture and low boiling substances removed by distillation to a temperature of 205° C. at 20 mm. pressure. The epoxy ether, in amount of 261 parts, is a pale yellow, viscous liquid. It has an epoxide value of 0.671 equivalent per 100 grams and the molecular weight is 324 as measured ebulloscopically in a dioxane solution. These values show that the glycidyl ether has an epoxy equivalency of 2.18—i. e., an average of 2.18 epoxide groups per molecule. In general, the polyglycidyl ethers of glycerol have an epoxy equivalency of 2 to 2.5.

The adhesive composition is prepared by adding 5% to 25% by weight of the triethyl amine to the fluid mixture of the glycidyl ether of a dihydric phenol. Preferably, about 10% to 15% of the triethylamine is used. This composition containing the curing agent will remain fluid for about 4 to 10 hours which permits adequate time for application thereof to the surfaces to be bonded. The composition cures to an insoluble state within 24 hours and this curing occurs at ordinary temperature of from 15° C. to 40° C.

The composition of the invention containing the curing agent is very effective for use as an adhesive in bonding a variety of materials, including metal-to-metal, resin-to-metal, metal-to-wood, wood-to-wood, metal-to-rubber, etc. With the preferred compositions, adhesive bonds of very high shear strength are obtained so as to make metal-to-metal bonding feasible. Furthermore, the attainment of cure of the applied adhesive is achieved without application of heat.

The effectiveness of the composition of the invention will be observed from the results given in Table I below. The adhesive composition contained equal parts by weight of Ether A and Ether B to which was added the noted percentages of triethylamine. The pot life is indicative of the time elapsed after addition of the curing agent to the composition to reach a viscosity of about 100,000 centipoises where it is just sufficiently fluid for spreading. Blocks made of linen sheets laminated together with phenolic resin were employed for the test. The adhesive composition was spread on a one inch square surface of each of two carefully cleaned blocks with the aid of a doctor blade having a clearance of 0.005 inch. The adhesive coated surfaces of the blocks were then united and the joined blocks were placed in a constant temperature room set at 77° F. After the times noted in the table, the blocks were subjected to the block shear test of the Army-Navy-Civil Committee on Aircraft Design Criteria: "Wood Aircraft Inspection and Fabrication," ANC–19 (December 20, 1943) discussed in an article by R. C. Rinker and G. M. Kline, Modern Plastics, vol. 23, p. 164, 1945. In order to test the resistance to water, united blocks after 6 days' time, were placed in boiling water for one hour, dried and cooled to room temperature after which it was subjected to the shear strength test.

Table I

| Triethyl-amine | Pot Life | Shear Strength after— | | | |
|---|---|---|---|---|---|
| | | 24 hrs. | 48 hrs. | 6 days | 6 days and boiling in water 1 hr. |
| Per cent | Hours | P. s. i. | P. s. i. | P. s. i. | P. s. i. |
| 7.5 | >7 | Not set | 330 | 2,960 | Failed |
| 10 | >6.5 | 190 | 2,260 | 2,320 | 1,350 |
| 12.5 | >6.5 | 970 | 2,420 | 3,070 | 3,420 |
| 15 | >6.25 | 1,530 | 2,430 | 2,920 | 1,580 |
| 20 | >6 | 1,720 | 2,640 | 2,620 | 1,240 |

The unique properties of the triethylamine as curing agent will be evident from the results given in Table II wherein the behavior of some of the closely related amines are noted. It was also desired to test trimethylamine as a curing agent but this was impossible since the compound was a gas at ordinary temperature (B. P.=3.5° C.) and will boil from the adhesive composition. For those curing agents which were capable of tests, phenolic blocks were again used to determine the shear strength. The composition contained equal parts by weight of Ether A and Ether B.

Table II

| Curing Agent | Percentage | Pot Life | Shear Strength after 6 days |
|---|---|---|---|
| Triethylamine | 5 | >24 hrs | 400 p.s.i. |
|  | 10 | 7.5 | 5,160. |
|  | 15 | 7.5 | 4,870. |
| Diethylamine | 5 | >48 | Soft. |
|  | 10 | >22 | 1,800. |
|  | 15 |  | 2,190. |
| Triethanolamine | 5 | Stays liquid for 6 days. |  |
|  | 10 |  | Soft. |
|  | 15 | >2 days | 540. |
| Di-n-propylamine | 5 | Stays liquid for 6 days. |  |
|  | 10 | Do. |  |
|  | 15 | Do. |  |
| Di-isopropylamine | 5 | Do. |  |
|  | 10 | Do. |  |
|  | 15 | Do. |  |
| Methyl diisopropylamine | 5 | Do. |  |
|  | 10 | Do. |  |
|  | 15 | Do. |  |

The compositions give very high shear strengths with aluminum as may be seen from the results given in Table III. The data indicate that the composition is very suitable for fabrication and manufacture of articles from aluminum. Again the composition contained equal parts of Ether A and Ether B to which was added the noted percentages of triethylamine. The blocks were aluminum which had been carefully cleaned.

Table III

| Triethylamine | Shear Strength after 6 days at 77° F. |
|---|---|
| Per cent | P. s. i. |
| 10 | 3,200 |
| 12.5 | 2,700 |
| 15 | 6,000 |

The composition gives excellent shear strengths with other materials as is illustrated by the results given in Table IV. The adhesive composition was equal parts by weight of Ether A and Ether B to which had been added 12.5% by weight of triethylamine. The blocks after coating and joinder were allowed to set for 6 days at 77° F. after which the shear strength was determined.

Table IV

| Block Material | Shear Strength after 6 days at 77° F. |
|---|---|
|  | P. s. i. |
| Brass and same | 1,600 |
| Copper and same | 1,930 |
| Cold rolled steel and same | 2,680 |
| 18-8 stainless steel and same | 2,250 |
| Aluminum and brass | 2,240 |

To illustrate the use of other diluents than the glycidyl of ether of glycerol, Table V shows the shear strength after various periods using phenyl glycidyl ether alone or in combination with the glycidyl ether of glycerol (Ether B) in a composition also containing Ether A. The pot life of all of these compositions was about 6 hours.

Table V

| 50% Ether A with | Shear Strength after | | | |
|---|---|---|---|---|
|  | 24 hrs. | 3 days | 6 days | 6 days and boiling in water 1 hr. |
|  | P. s. i. | P. s. i. | P. s. i. | P. s. i. |
| 40% Ether B and 10% P. G. E.[1] | 1,810 | 3,140 | 3,070 | 3,360 |
| 30% Ether B and 20% P. G. E. | 270 | 870 | 2,260 | 2,830 |
| 25% Ether B and 25% P. G. E. | 290 | 2,060 | 2,090 | 1,500 |
| 50% P. G. E. | 1,660 | 1,070 | 1,050 |  |

[1] Phenyl glycidyl ether.

As explained hereinbefore, substantially non-volatile inert solvents may be used for obtaining fluidity for the glycidyl ethers of the polyhydric phenols. Thus, upon mixing dibutyl phthalate with Ether A in proportions of 20% by weight of the ester with 80% of the ether, there is obtained a mixture of workable fluidity. Results obtained upon adding various percentages of triethylamine to the mixture and using this composition as an adhesive with the phenolic laminated linen blocks are indicated in Table VI. It will be noted that the shear strengths obtained by employment of the inert solvent are inferior to those described before wherein a reactive epoxy-containing solvent was used.

Table VI

| Triethylamine | Pot Life | Shear Strength after— | | |
|---|---|---|---|---|
|  |  | 24 hrs. | 6 days | 6 days and boiling in water 1 hr. |
| Per cent | Hours | P. s. i. | P. s. i. | P. s. i. |
| 10 | 5 | 250 | 400 | 470 |
| 12.5 | 5 | 1,070 | 400 | 230 |
| 15 | 4.75 | 220 | 370 | 420 |

As is evident, utilization of the compositions to achieve the objects of the invention is readily accomplished. The desired proportion of triethylamine is added to the fluid mixture comprising the glycidyl ether of the polyhydric phenol. While still fluid, the composition is applied, such as by spreading, to at least one but preferably two of the surfaces to be united. The thickness of the film of applied adhesive is kept at a minimum for sake of economy; film thickness being from 0.002 to 0.05 inch. The surfaces are then united while the applied adhesive remains fluid and the contact is maintained by suitable means such as clamps or weights, if necessary, until the composition has solidified and hardened. The contact is continued by use of the clamps or the like until the hardening is sufficient to permit such roughness of handling as may be required with the particular article being manufactured. The joining article is then set aside for a reasonable time, like a week, which permits the composition to complete the hardening. All of these operations are conducted with the heating at normal atmospheric temperature such as 15° C. to 40° C.

While the compositions fill a particular need in enabling joinder of metal surfaces in the manufacture of sundry articles, they are also suitable for uniting other surfaces so as to give a bond of great strength. Thus, the compositions may be used in manufacturing shoes from leather, rubber and/or plastic sheeting; for joining glass; for joining resins; etc. The compositions are also very suitable for manufacture of furniture and other articles from wood, or combinations of wood, metal, plastic and the like. The adhesive solution can be mixed with clay, wood flour, cotton linter and fibers, mineral fillers, pigments, etc., to produce calking compounds, fillers, putty-like compositions, and moldable products.

We claim as our invention:

1. A composition of matter suitable for use as a cold-setting adhesive obtained by adding 5% to 25% of triethylamine to a fluid mixture comprising glycidyl ether of a dihydric phenol having a 1,2-epoxy equivalency greater than 1.0 which ether is obtained by reacting one mol of the dihydric phenol with at least one mol of epichlorhydrin in the presence of at least a stoichiometric quantity of an inorganic base, said composition having a viscosity at 20° C. when first compounded of 1,000 to 50,000 centipoises.

2. A method of uniting two solid surfaces which comprises effecting the following series of steps at a temperature of 15° C. to 40° C. without heating: applying a coating of the composition defined by claim 1 while it is still fluid to at least one of the surfaces, bringing the second surface into contact with the first coated surface while the applied adhesive remains fluid, and maintaining the contact at least until the adhesive has solidified and hardened.

3. A composition of matter suitable for use as a cold-setting adhesive obtained by adding 10% to 15% of triethylamine to a fluid mixture comprising glycidyl ether of bis-(4-hydroxyphenyl)-2,2-propane obtained by reacting one mol of the phenol with 1 to 2.5 mols of epichlorhydrin in the presence of at least a stoichiometric quantity of an alkali metal base, said composition having a viscosity at 20° C. when first compounded of 1,000 to 50,000 centipoises.

4. A method for uniting two solid surfaces which comprises applying a coating of the composition defined in claim 3 while it is still fluid to at least one of the surfaces, bringing the second surface into contact with the first coated surface while the applied adhesive remains fluid, and maintaining the contact at least until the applied adhesive has solidified and hardened, all of said operations being effected at a temperature of 15° C. to 40° C.

5. A composition of matter suitable for use as a cold-setting adhesive obtained by adding 10% to 20% of triethylamine to a fluid mixture comprising a polyglycidyl ether of glycerol and glycidyl ether of bis-(4-hydroxyphenyl)-2,2-propane having a 1,2-epoxy equivalency of 1.1 to 1.5 obtained by reacting the dihydric phenol with epichlorhydrin in the presence of at least a stoichiometric quantity of an alkali metal base, said composition having a viscosity at 20° C. when first compounded of 1,000 to 50,000 centipoises.

6. A method for uniting two solid surfaces which comprises applying a coating of the composition defined in claim 5 while it is still fluid to at least one of the surfaces, bringing the second surface into contact with the first coated surface while the applied adhesive remains fluid, and maintaining the contact at least until the applied adhesive has solidified and hardened, all of said operations being effected at a temperature of 15° C. to 40° C.

7. A composition of matter suitable for use as an adhesive obtained by adding 10% to 15% of triethylamine to a fluid mixture consisting essentially of (1) polyglycidyl ether of glycerol having a 1,2-epoxy equivalency of about 2.2 and (2) glycidyl ether of bis-(4-hydroxyphenyl)-2,2-propane obtained by reacting 1.25 mols of epichlorhydrin with 1 mol of said phenol and 1.4 mols of sodium hydroxide.

8. A method for uniting two solid surfaces which comprises applying a coating of the composition defined in claim 7 while it is still fluid to at least one of the surfaces, bringing the second surface into contact with the first coated surface while the applied adhesive remains fluid, and maintaining the contact at least until the applied adhesive has solidified and hardened, all of said operations being effected at a temperature of 15° C. to 40° C.

9. A composition of matter suitable for use as an adhesive obtained by adding 10% to 15% of triethylamine to a fluid mixture consisting essentially of (1) 0.2 to 1 part by weight of phenyl glycidyl ether, (2) 0.0 to 0.8 part by weight of glycidyl ether of glycerol having a 1,2-epoxy equivalency of about 2.2, and (3) 1 part by weight of glycidyl ether of bis-(4-hydroxyphenyl)-2,2-propane obtained by reacting 1.25 mols of epichlorhydrin with 1 mol of said phenol and 1.4 mols of sodium hydroxide, said composition containing such proportions within the stated amounts of the named ingredients that the viscosity of said composition at 20° C. when first compounded is 1,000 to 50,000 centipoises.

10. A composition of matter suitable for use as an adhesive obtained by adding 10% of triethylamine to a fluid mixture consisting essentially of 20% of dibutyl phthalate, and 80% of glycidyl ether of bis-(4-hydroxyphenyl)-2,2-propane obtained by reacting 1.25 mols of epichlorhydrin with 1 mol of said phenol and 1.4 mols of sodium hydroxide.

HERBERT A. NEWEY.
EDWARD C. SHOKAL.

REFERENCES CITED

The following references are of record in the file of this patent:

UNITED STATES PATENTS

| Number | Name | Date |
| --- | --- | --- |
| 2,255,487 | Feagin | Sept. 9, 1941 |
| 2,312,321 | D'Alelio | Mar. 2, 1943 |
| 2,380,185 | Marple et al. | July 10, 1945 |
| 2,400,333 | Bent et al. | May 14, 1946 |
| 2,444,333 | Castan | June 29, 1948 |
| 2,506,486 | Bender et al. | May 2, 1950 |